March 16, 1965  A. J. LUPO, SR  3,173,401
RACING DOG MUZZLE
Filed Aug. 19, 1963  2 Sheets-Sheet 1
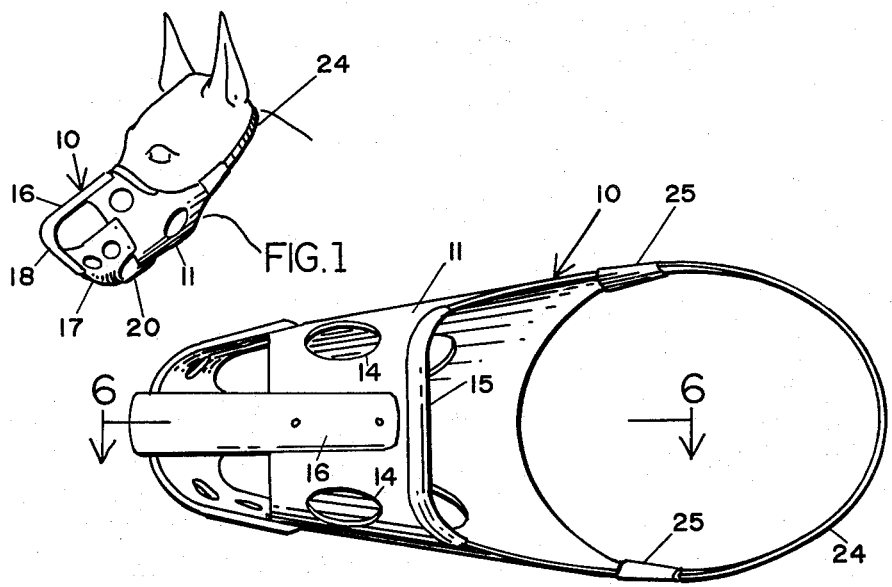
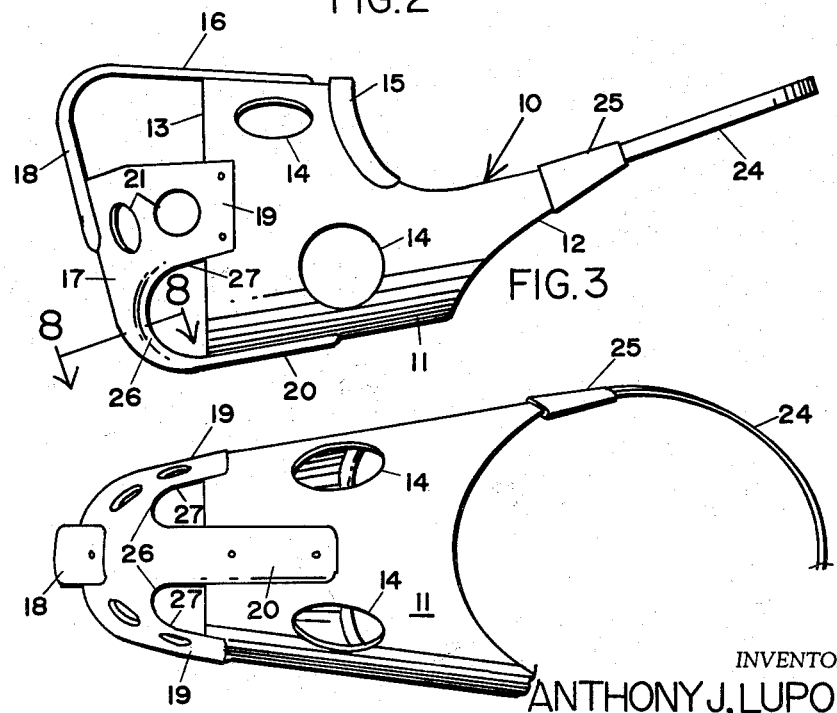
INVENTOR.
ANTHONY J. LUPO Sr.

March 16, 1965   A. J. LUPO, SR   3,173,401
RACING DOG MUZZLE

Filed Aug. 19, 1963   2 Sheets-Sheet 2

INVENTOR.
ANTHONY J. LUPO Sr.
BY
Salvatore G Militano
attorney

United States Patent Office

3,173,401
Patented Mar. 16, 1965

3,173,401
RACING DOG MUZZLE
Anthony J. Lupo, Sr., 5100 NW. 178th Terrace,
Miami, Fla.
Filed Aug. 19, 1963, Ser. No. 302,840
2 Claims. (Cl. 119—133)

This invention relates to dog muzzles and is more particularly directed to muzzles used by dogs in the sport of dog racing.

A principal object of the present invention is to provide a dog muzzle which is sturdy in construction, form fitting to the dog's face but does not hamper the dog's ability to breathe with ease.

Another object of the present invention is to provide a racing dog muzzle which cannot inadvertantly slip off a dog's face nor one which the dog himself can remove but is readily removed by a person.

Another object of the present invention is to provide a racing dog muzzle with a strap fastened by snap fasteners that is shrouded by a sleeve to prevent the straps from being inadvertantly unfastened.

A still further object of the present invention is to provide a racing dog muzzle with nose and jaw guard which is quasi rigid with the outer edges of the guard rounded to prevent injury to a dog's tongue when a dog extends his tongue thorugh the openings in the muzzle.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIGURE 1 is a perspective view of a dog's head on which is positioned a muzzle embodying my invention.

FIGURE 2 is a top plan view.

FIGURE 3 is a side elevational view.

FIGURE 4 is a bottom plan view.

Figure 5:
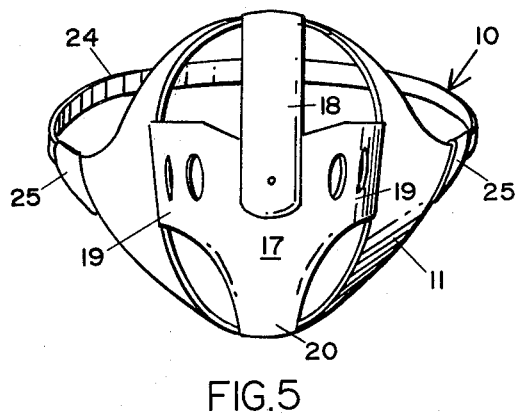
FIGURE 5 is a front elevational view.
Figure 7:
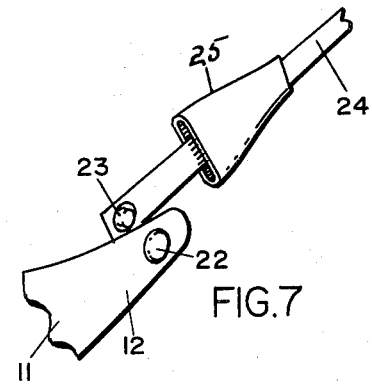
FIGURE 7 is a fragmentary perspective view of the strap fastener.

Referring to the drawings wherein like numerals are used to designate similar parts throughout the several views, the numeral 10 refers to a muzzle embodying my invention for use on dogs and especially when racing with other dogs.

The muzzle 10 consists of a face guard member 11 having an approximately oval cross sectional shape and constructed of relatively soft material such as leather, plastic and the like which encircles the dog's face and jaws. The face guard member 11 extends at each side rearwardly to end portions 12 from the base of the dog's jaws to a mid-portion of the dog's face terminating in a vertical cut at the forward portion as at 13. The guard member 11 is provided with a plurality of holes 14 to permit air to circulate therethrough. Padding 15 is provided at the inner edge of the face guard member 11 in order that the dog's nose at the bridge is not irritated or bruised by the edge of the face guard member 11 which bears thereagainst when the muzzle is in place on the dog's face as shown by FIGURE 1.

Figure 8:
FIGURE 8 is a cross sectional view taken along the line 8—8 of FIGURE 3.
Figure 6:
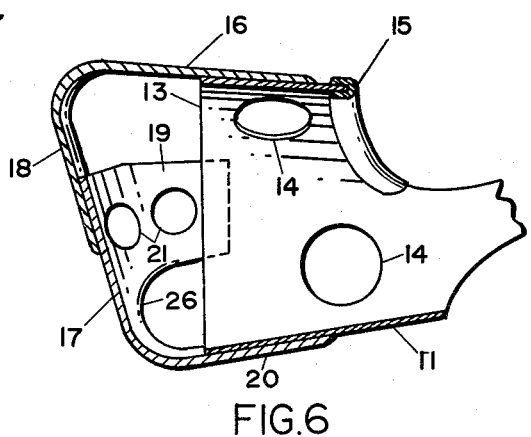
FIGURE 6 is a cross sectional view taken along the line 6—6 of FIGURE 2.

Extending forwardly of the face guard member 11 is a nose guard member 16 and a mouth guard member 17. The nose guard member 16 is a substantially L-shaped rigid, elongated strip of plastic material cemented or otherwise secured at one end to the top surface of the oval shaped face guard member 11 and the other end which extends as at 18 at an oblique angle to the other portion thereof is secured to the upper portion of the mouth guard member 17. The mouth guard member 17 is made of the same rigid material as the nose guard member 16 and is U-shaped having side portions 19 extending toward and secured to the front edge portion 13 of the face guard member 11 and a lower leg portion 20 secured to the lower surface of the oval shaped face guard member. Holes 21 are provided in the side portions 19 of the mouth guard 17 to permit the circulation of air therethrough. Edge portions 26 of the mouth guard member 17 are rounded as shown by FIG. 8 to prevent a dog's tongue becoming bruised when the dog extends his tongue through the openings 27 on each side of the muzzle 10.

At the ends 12 of the face guard member 11 is a snap fastener 22 which receives companion snap fasteners 23 mounted on both end portions of strap 24 which encircles the dog's head at its neck. A pliable sleeve 25 is slidably positioned on the end portions of the strap 24 and whose function is to enshroud the snap fasteners 22, 23 in their engaged positions to prevent the inadvertant unfastening of the snap fasteners 22, 23 as may occur when racing dogs brush against each other during a race.

Having disclosed my invention, what I claim as new and desire to secure by Letters Patents of the United States is:

1. A muzzle for a dog comprising a face guard member having a substantially oval shaped cross section terminating in a vertically disposed front end portion and a plurality of substantially horizontally extending rear end portions, an elongated strap for encircling a dog's head, said strap having end portions, fastening members mounted on said rear end portions, companion fastening members mounted on said end portions of said strap releasably securing said strap to said face guard member, a plurality of sleeves slidably mounted on said straps enshrouding said fastening mmbers, a substantially rigid mouth guard member having a pair of vertically disposed side portions and a horizontally extending leg portion, said side portions being secured to said front end portion of said face guard member with said leg portion secured to a lower surface of said face guard member and an elongated L-shaped nose guard having one end portion secured to an upper surface of said face guard member and another end portion secured to said mouth guard member.

2. A muzzle for a dog comprising a face guard member having a substantially oval shaped cross section terminating in a vertically disposed front end portion and a plurality of substantially horizontally extending rear end portions, an elongated strap for encircling a dog's head, said strap having end portions, fastening members mounted on said rear end portions, companion fastening members mounted on said end portions of said strap releasably securing said strap to said face guard member, a plurality of sleeves slidably mounted on said straps enshrouding said fastening members, a substantially rigid mouth guard member having a pair of vertically disposed side portions and a horizontally extending leg portion, said side portions being secured to said front end portion of said face guard member with said leg portion secured to a lower surface of said face guard member and an elongated L-shaped nose guard having one end portion secured to an upper surface of said face guard member and another end portion secured to said mouth guard member, said leg portion of said mouth guard having rounded edge portions whereby said rigid mouth guard will not cut or otherwise injure a dog's tongue.

References Cited by the Examiner

UNITED STATES PATENTS

| Re. 14,762 | 11/19 | Springer | 54—23 |
| 92,315 | 7/69 | Kaempf | 119—133 |
| 1,488,768 | 4/24 | Tobin et al. | 54—80 |
| 1,773,774 | 8/30 | Carr | 119—133 |
| 1,840,957 | 1/32 | Kaehler | 54—80 |
| 2,696,195 | 12/54 | McCall | 119—133 |

SAMUEL KOREN, *Primary Examiner.*

ALDRICH F. MEDBERY, *Examiner.*